United States Patent
Tarui et al.

(10) Patent No.: US 7,281,152 B2
(45) Date of Patent: Oct. 9, 2007

(54) PROCESSOR, CONTROL DEVICE FOR A PROCESSOR, CLOCK FREQUENCY DETERMINING METHOD AND SOURCE VOLTAGE CONTROLLING METHOD OF A PROCESSOR

(75) Inventors: Masaya Tarui, Kanagawa-Ken (JP); Shinichi Kanno, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 420 days.

(21) Appl. No.: 10/808,571

(22) Filed: Mar. 25, 2004

(65) Prior Publication Data

US 2004/0193937 A1 Sep. 30, 2004

(30) Foreign Application Priority Data

Mar. 27, 2003 (JP) .............................. 2003-086795

(51) Int. Cl.
*G06F 5/06* (2006.01)
*G06F 1/00* (2006.01)
*H04L 5/00* (2006.01)

(52) U.S. Cl. ................. 713/600; 713/400; 713/322

(58) Field of Classification Search ............... 713/600, 713/400, 322; 323/283
See application file for complete search history.

(56) References Cited

U.S. PATENT DOCUMENTS 5,991,003 A * 11/1999 Imahashi et al. ........... 352/12
6,335,870 B1 * 1/2002 Sakurai ..................... 363/34
6,581,164 B1 * 6/2003 Felts et al. .................. 713/400
6,647,502 B1 * 11/2003 Ohmori ..................... 713/322
2003/0184271 A1 * 10/2003 Aisaka et al. ............... 323/283

FOREIGN PATENT DOCUMENTS

JP 2001-202155 7/2001
JP 2002-358139 12/2002

OTHER PUBLICATIONS

"Radio Communicating Apparatus, Radio Communicating Method, and Recording Medium", U.S. Appl. No. 09/466,929.
Satoshi Kaburaki, et al., "Processor, Arithmetic Operation Processing Method, and Priority Determination Method", filed Jan. 8, 2004.
U.S. Appl. No. 10/752,703, filed Jan. 8, 2004, to Kaburaki et al.
U.S. Appl. No. 09/466,929, filed Dec. 20, 1999, to Yoshida et al.

* cited by examiner

*Primary Examiner*—Suresh K Suryawanshi
(74) *Attorney, Agent, or Firm*—Finnegan, Henderson, Farabow, Garrett & Dunner, L.L.P.

(57) ABSTRACT

A processor includes a clock signal generator generating clock signals; an operational processing part performing data processing which is divided into a plurality of execution units, in accordance with the clock signals; a storage storing data used when each execution unit is executed by the operational processing part; a data amount detector detecting amounts of the data stored in the storage per each execution unit; a clock frequency determining part determining a new clock frequency of the clock signals by using the amounts of the data, the clock signals being supplied newly to the operational processing part.

2 Claims, 7 Drawing Sheets

PROCESSOR, CONTROL DEVICE FOR A PROCESSOR, CLOCK FREQUENCY DETERMINING METHOD AND SOURCE VOLTAGE CONTROLLING METHOD OF A PROCESSOR

CROSS-REFERENCE TO RELATED APPLICATIONS

This application is based upon and claims the benefit of priority from the prior Japanese Patent Application No. 2003-86795, filed on Mar. 27, 2003, the entire contents of which are incorporated herein by reference.

BACKGROUND OF THE INVENTION

1. Field of the Invention

The present invention relates to a processor, a clock determining method and a drive voltage determining method that are capable of reducing power consumption of a processor for data processing. Especially, the present invention relates to a processor having storage regions for storing data to be processed in the form of divisional execution units respectively.

2. Related Background Art

A processor intended for data processing normally needs a clock as the reference of the synchronization of processing by individual means of the processor.

The higher the frequency of the clock as the reference of synchronization of respective means of a processor, the higher the processing speed of the entire processor will be increased, and the processing rate per unit time will increase (enhancement of the throughput).

However, as the clock frequency becomes higher, signals flowing through internal wirings of the processor can not match the speed, and it will be necessary to raise the voltage supplied to the processor. Such a limit in the flow rate of signals relative to a certain voltage is caused by the floating capacitance and the electric resistance inside the processor. Because the structures of processors are composed of semiconductors, it is difficult to remove all these disadvantages.

Any increase in the drive voltage of a processor invites an increase in the electric power consumed in the processor. This invites not only an increase in the power consumption but also an increase in heat generated therein, which may adversely affect the integration of processors.

For these reasons, it is important to limit the clock frequency of the processor in operation to limit the power consumption of the processor itself.

To limit the power consumption, some methods have been proposed. In one method, an operating system used to control a processor selects low-frequency clocks for execution of units of tasks with lower priorities (for example, Japanese Patent Laid-open Publication JP2001-202155A). In another method, the supply of clocks is interrupted when there is ample time for processing (for example, Japanese Patent Laid-open Publication JP2002-358139A).

In typical processors intended for data processing, the higher the driving clock frequency the higher the processing efficiency. However, it results in increasing the power consumption of the processor and hence increases the heat generated therein.

SUMMARY OF THE INVENTION

An advantage of an aspect of the present invention is to provide a processor having storage regions for storing data to be processed for individual execution units to alleviate the above-discussed problems, and to provide a clock determining method of the processor and a drive voltage determining method of the processor.

An aspect of the present invention is a processor comprising a clock signal generator generating clock signals; an operational processing part performing data processing which is divided into a plurality of execution units, in accordance with the clock signals; a storage storing data used when each execution unit is executed by the operational processing part; a data amount detector detecting amounts of the data stored in the storage per each execution unit; a clock frequency determining part determining a new clock frequency of the clock signals by using the amounts of the data, said clock signals being supplied newly to the operational processing part.

Another aspect of the present invention is a control device for a processor comprising a clock signal generator generating clock signals; an operational processing part performing data processing which is divided into a plurality of execution units, in accordance with the clock signals; a storage storing the data distinctively in form of the respective execution units; a data amount detector detecting amounts of data in the storage; a clock frequency determining part determining a new clock frequency of the clock signals by using the amounts of data, said clock signals being supplied newly to the operational processing part.

An aspect of the present invention is a clock frequency determining method determining a clock frequency supplied to a processor, which comprises an operational processing part processing data in accordance with clock signals and a storage storing the data distinctively in form of the respective execution units, comprising detecting amounts of data of the respective execution units stored in the storage; determining a new clock frequency to be supplied to the operational processing part on the basis of the result of the detection; generating clock signals supplied to the operational processing part in accordance with a new clock frequency. Another aspect of the present invention is a source voltage controlling method, in which the source voltage is supplied to a processor comprising an operational processing part processing data in accordance with a clock signal and a storage storing the data distinctively in form of the respective execution units, comprises detecting amounts of data of the respective execution units stored in the storage; determining a new clock frequency to be supplied to the operational processing part on the basis of the result of the detection; controlling the source voltage to be supplied to the operational processing part, following to the new clock frequency.

DETAILED DESCRIPTION OF THE INVENTION

Some embodiments of the invention will now be explained below with reference to the drawings.

FIRST EMBODIMENT

Figure 1:
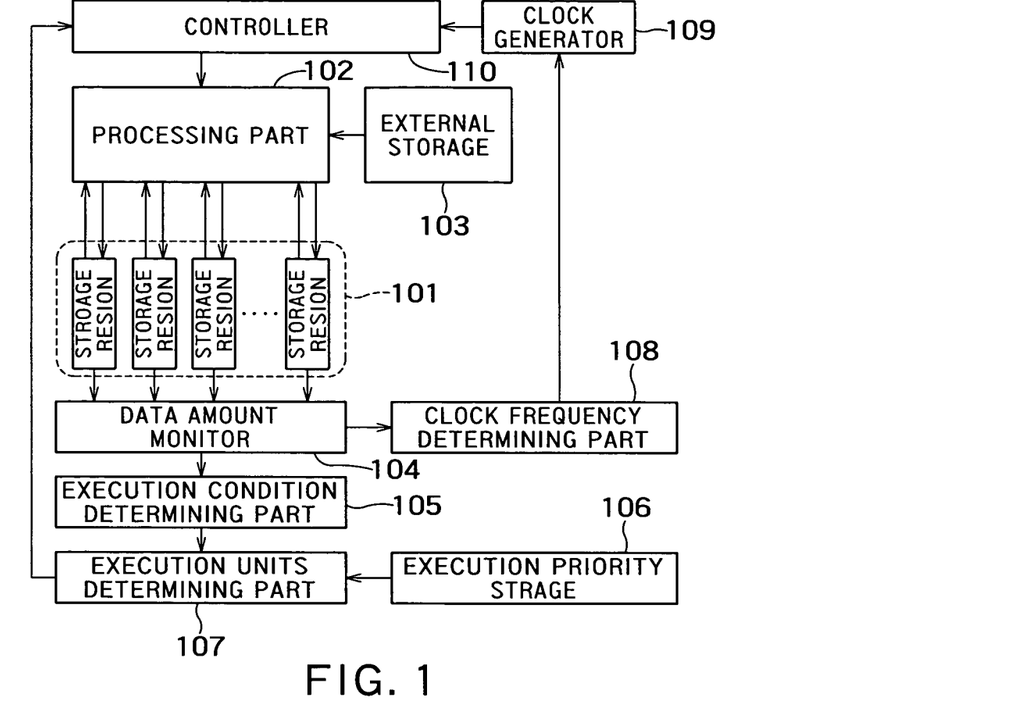
FIG. 1 is a diagram showing an exemplary block arrangement of a processor according to the first embodiment of the invention.

FIG. 1 shows an exemplary block arrangement of a processor according to the first embodiment. Here are shown a storage 101, an operational processing part 102, an external storage 103, a data amount monitor 104, an execution condition determining part 105, an execution priority storage 106, an execution unit determining part 107, a clock frequency determining part 108, a clock generating potion 109 and a controller 110.

The storage 101 includes one or more divisional storage regions each associated with one of execution units to be executed by the processor according to the embodiment. A single data processing is divided into a plurality of execution units. Data to be processed is divided into a plurality of portions each corresponding to one of execution units, and each storage region stores data for each associated execution unit. Relation between the storage regions and execution units are managed by the controller 110, for example.

The storage 101 has the function to notify the data amount monitor 104 of information on amounts of data stored in individual storage regions. The notice of information may be given to the data amount monitor 104 upon a request from the data amount monitor 104, or may be given to the data amount monitor 104 by the storage 101 voluntarily.

The operational processing part 102 has the function of executing program codes previously stored in the external storage 103, program codes which correspond to individual execution units. Data to be processed during execution of the program code corresponding to each execution unit is read out from the storage region in the storage 101 to which the data associated with the execution unit is assigned. The data once read out and processed are erased from the storage region from which the data were read out. Alternatively, the data are regarded as already processed data, and removed from the data to be processed subsequently.

The external storage 103 mainly stores program codes to be executed by the operational processing part 102. Additionally, it is used also as a temporary shunting region of data required for execution of a program code or data currently under processing, for example.

The data amount monitor 104 monitors the amount of data currently stored in the storage 101. The monitoring of the data amounts may be configured to monitor the storage amount in the entire storage 101 or monitor all or part of storage regions corresponding to individual execution units in the storage 101 for individual storage regions as desired. The result of the monitoring is sent to the execution condition determining part 105 and the clock frequency determining part 108.

The execution condition determining part 105 judges, by using the information given from the data amount monitor 104, whether the execution unit to be subsequently executed is executable or not. The relation between the currently executed or standby execution unit and a storage region of the storage 101 informed of from the data amount monitor 104 may be acquired from the controller 110, for example. Alternatively, the execution condition may have a table previously storing relations such that any of such relations can be acquired from the table.

For judgment of the condition for executing a certain execution unit, i.e. judgment of the execution condition, by the execution condition determining part 105, it is possible to determine an execution unit executable if an amount not less than a predetermined amount of data to be processed is stored in the storage 101.

Information on executability, which is a result of judgment by the execution condition determining part 105 about the execution possibility of each execution unit, is given to the execution unit determining part 107.

The execution priority storage 106 stores priority information indicating which one of currently executed or standby execution units should be executed preferentially. Let an execution unit assigned with a high priority be treated as having a high possibility of being executed by the processor according to the instant embodiment. Priorities of respective execution units may be assigned previously before execution, or individual execution units may have fixed priorities. Priorities of individual execution units stored are used by the execution unit determining part 107 upon determination of an execution unit to be executed next.

The execution unit determining part 107 determines an execution unit, which is subsequently executed, by using the executability information from the execution condition determining part 105 and the priority information from the execution priority storage 106. Determination of the execution unit to be subsequently executed herein means selection of the execution unit having the highest priority from executable execution units for example.

Even in a multitask-type processor capable of executing a plurality of execution units simultaneously, the determination of execution unit to be subsequently executed by the execution unit determining part 107 is the same as the determination of an execution unit to be next executed in that processor.

The clock frequency determining part 108 determines the clock frequency supplied to the processor according to the instant embodiment, based on the information of the data amounts in storage regions of the storage 101, data amounts which are monitored by the data amount monitor 104. The information from the data amount monitor 104 on the amount of data in storage in the storage 101 may be a result of monitoring the storage amount in the entire storage 101 or may be a result of monitoring the data amount in a certain storage region of the storage 101, which is associated with an execution unit, when required.

Figure 2A:
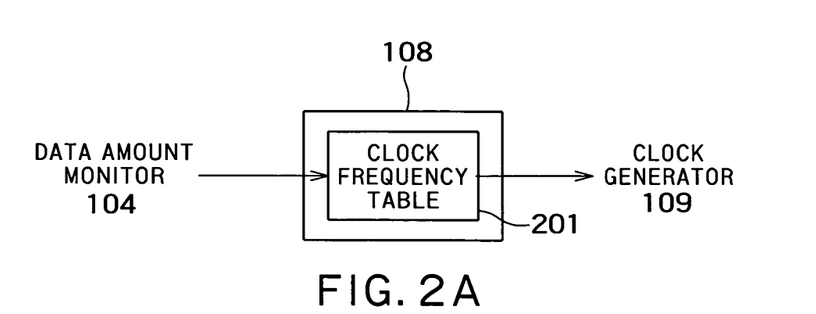
FIG. 2A is a diagram showing an exemplary arrangement of a clock frequency determining part in the first embodiment.
Figure 2B:
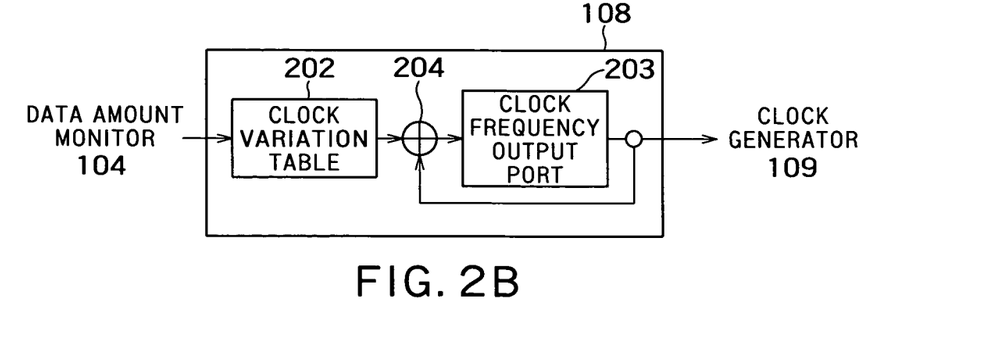
FIG. 2B is a diagram of another exemplary arrangement of the clock frequency determining part in the first embodiment.

FIGS. 2A and 2B are diagrams showing exemplary internal configurations of the clock frequency determining part 108.

The configuration in FIG. 2A is for obtaining the clock frequency to be notified to the clock generator 109 with reference to a clock frequency table 201 which is previously prepared based upon data amounts notified by the data amount monitor 104.

Figure 3:
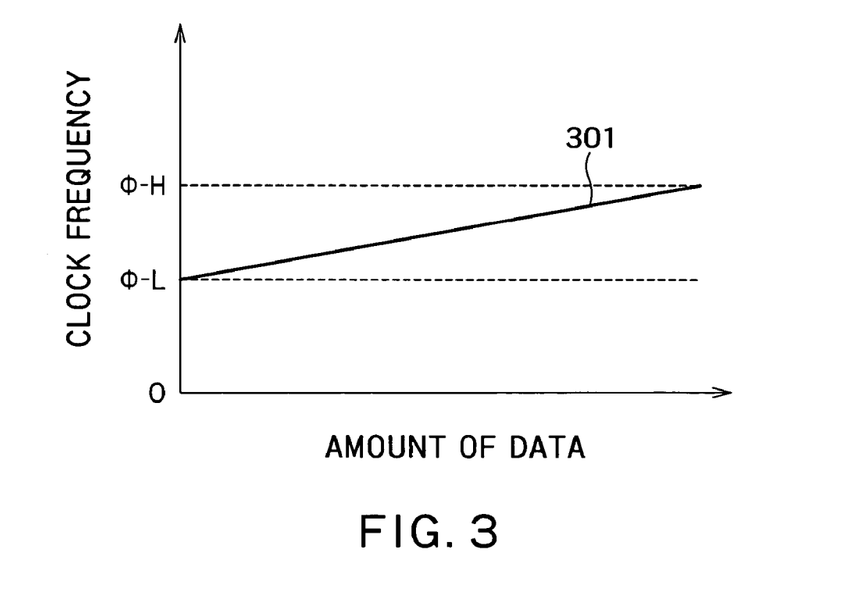
FIG. 3 is a graph showing exemplary contents of a clock frequency table in the first embodiment.

FIG. 3 is an exemplary graph 301 exhibiting a relation of the clock frequency relative to the amount of data in the storage regions. In the example of FIG. 3, the clock frequency varies in response to the amount of data within a range from the maximum clock frequency (Φ-H) to the minimum clock frequency (Φ-L). A clock frequency corresponding to the data amount informed by the data amount monitor 104 is obtained from the clock frequency table 201 prepared based on values of respective points on the graph 301, and it is given to the clock generator 109 as a notification.

The configuration of FIG. 2B is for obtaining a clock frequency to be next notified by adding a predetermined variation, which corresponds to the data amount notified by the data amount monitor 104, to the clock frequency last notified to the clock generator 109.

A clock variation table 202, clock frequency output port 203 and adder 204 are shown in FIG. 2B. The clock variation table 202 is a table storing variation values of clocks for amounts of data stored. The clock frequency output port 203 has the function of holding information on clock frequencies once outputted. The adder 204 has the function of adding two values.

Figure 4:
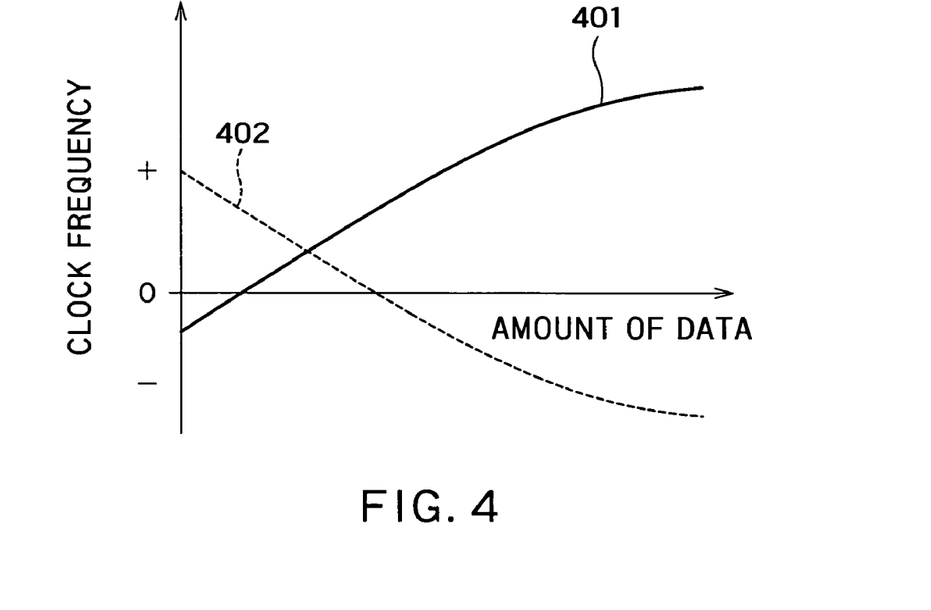
FIG. 4 is exemplary contents of a clock variation table in the first embodiment.

FIG. 4 shows exemplary contents of the clock variation table 202 in form of a graph.

In case of the graph 401, once the data amount in one of the storage regions is reduced close to zero, the clock frequency determining part 108 judges that there is almost no data to be processed, and exhibits a minus variation so as to lower the clock frequency for driving the processor according to the instant embodiment. If the minus variation continues, the adder 204 continuously lowers the clock frequency output from the clock frequency output port 203. Responsively, the clock frequency notified to the clock generator 109 gradually lowers. The power consumption of the processor can be reduced by just the lowered level of the clock frequency.

In contrast, in case a large amount of data remains in storage, the clock frequency determining part 108 judges that the data need immediate processing. Accordingly, the clock frequency determining part 108 exhibits a plus variation so as to increase the clock frequency. As a result, the clock frequency informed to the clock generator 109 gradually becomes higher, and the shortage of the processing capability of the processor can be compensated.

In case of the graph 402, the control of the clock frequency is done oppositely to that of the graph 401. This is applicable in case the output of the processor according to the instant embodiment should be kept constant, for example. For stably supplying the next-stage device with a streaming data of results of processing such as audio output or video output, the mode of control of the graph 402 will be applicable, for example.

Here is made a review of the storage regions assigned to respective execution units in the storage corresponding to the output stage of the processor. Once the data amount in storage reaches zero, it is highly possible that output data runs short and underruns (shortage of data). On this account, a plus clock variation is used to increase the clock frequency to be notified to the clock generator 109. As a result, the clock frequency gradually increases and the processing efficiency of the processor is enhanced. Thus, the underrun can be prevented.

In contrast, in case the data amount in storage is abundant, a minus clock variation is used to prevent an overrun (overflow of data). As a result, the clock frequency to be notified to the clock generator 109 gradually decreases, and the processing capability of the processor gradually decreases. Thus, the overrun can be prevented. It is also possible to suppress power consumption by the surplus capability corresponding to the decreased clock frequency.

The clock frequency determining part 108 may be configured to determine the clock frequency based on the information about the data amount in a plurality of storage regions of the storage 101.

Figure 5:
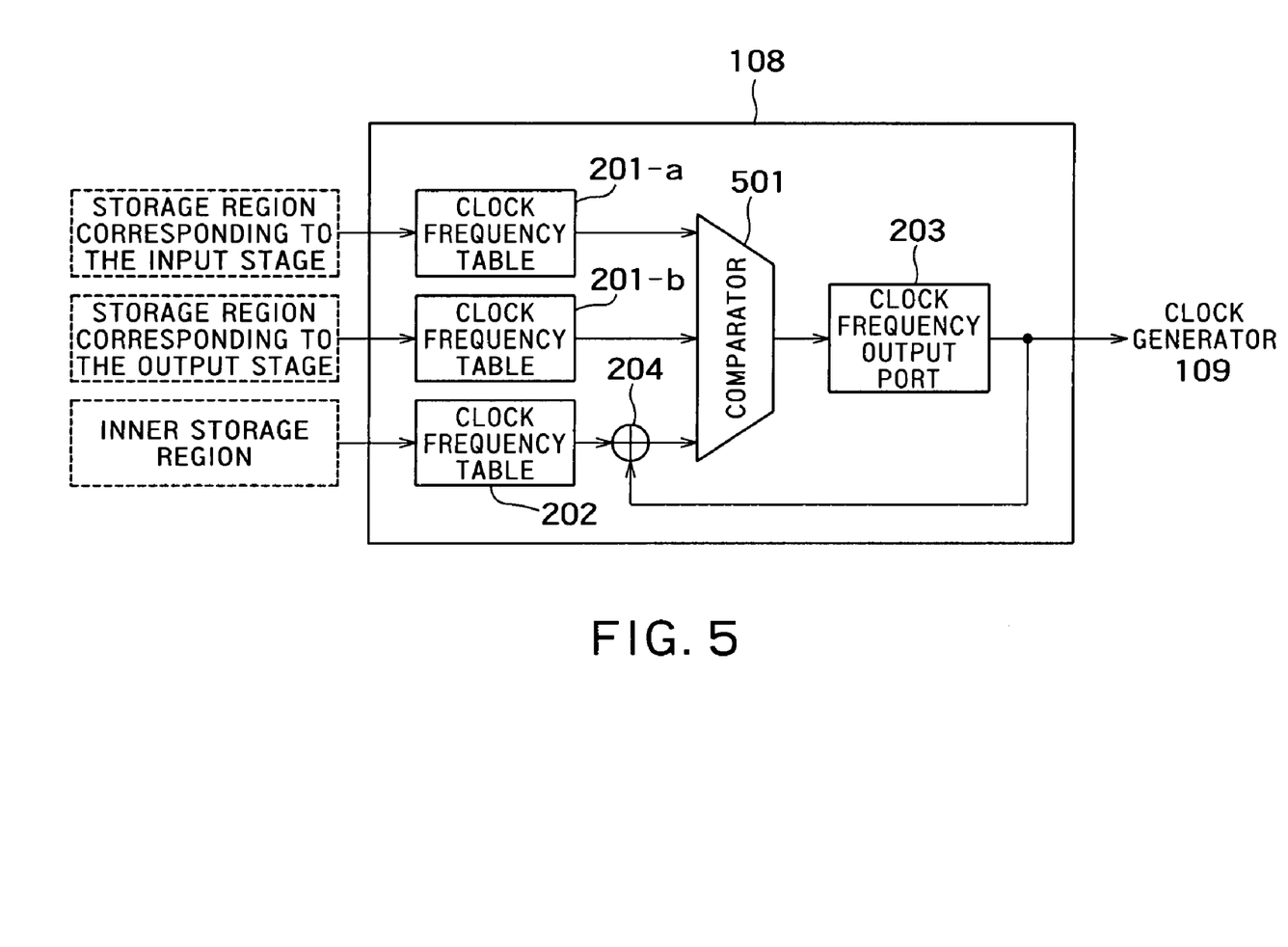
FIG. 5 is a diagram showing an exemplary arrangement of a clock frequency determining part in the first embodiment.

FIG. 5 shows a block arrangement of the clock frequency determining part 108 having a comparator.

The arrangement in FIG. 5 includes the comparator 501 in addition to the arrangement shown in FIGS. 2A and 2B. It includes two tables, namely a clock frequency table 201-$a$ and a clock frequency table 201-$b$ similar to those shown in FIG. 2A, for two storage regions of storage 101, respectively. Furthermore, it includes a clock variation table similar to that shown in FIG. 2B for another one of the storage regions.

Thus, the clock frequency determining part 108 first determines clock frequencies independently by independent methods from information on data amounts in storage in those three among the storage regions of the storage 101, and then determines one clock frequency to be notified to the clock generator 109 by using the comparator 501. For example, the clock frequency determining part 108 may select the highest of three clock frequencies input to the comparator 501. Since the clock frequency determined here is used for all execution units supplied to the processor, it will be possible to prevent shortage of processing capability for a certain execution unit by selecting the highest clock frequency.

Although FIG. 5 shows the example of determining the clock frequency based on data amounts in storage in three storage regions by combining FIGS. 2A and 2B, this concept is applicable also to versions configured to determine the clock frequency based on data amounts in storage in four or more storage regions. Furthermore, combination of FIGS. 2A and 2B is not limited to this embodiment but may be modified appropriately. Alternatively, in addition to the way of determination shown in FIGS. 2A and 2B, any way other than that of the instant embodiment is employable to the present invention as far as it determines the clock frequency based on the data amounts in storage regions.

The clock generator 109 generates clocks for driving the processor according to the instant embodiment in compliance with the clock frequency determined by the clock frequency determining part 108. The clocks generated are input to the controller 110 and used for controls of respective means in the processor.

SECOND EMBODIMENT

Figure 6:
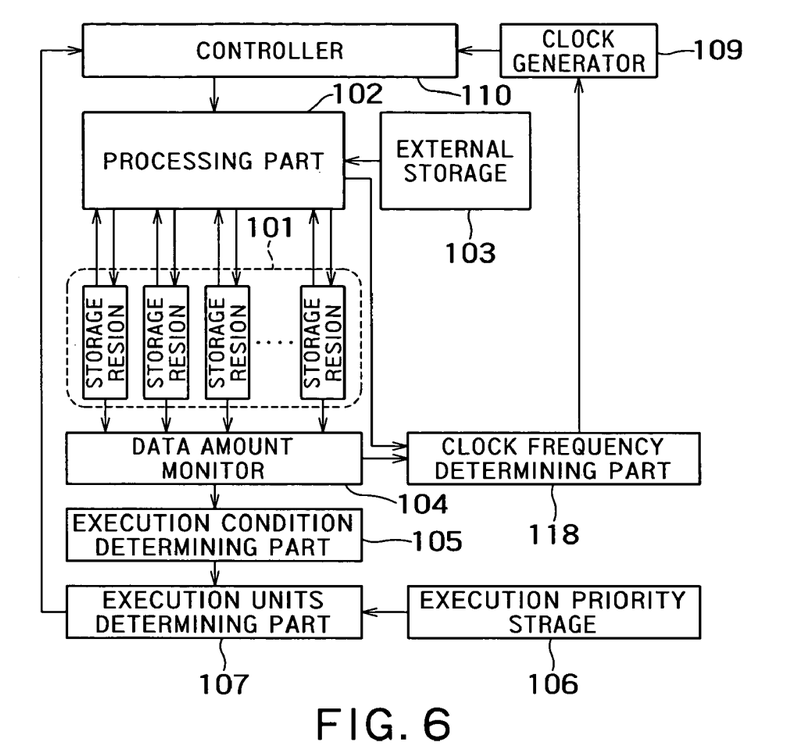
FIG. 6 is a diagram showing an exemplary block arrangement of a processor according to the second embodiment.

FIG. 6 shows an exemplary block arrangement of a processor according to the second embodiment. The block arrangement shown here is different from the block arrangement of the first embodiment shown in FIG. 1 in including a clock frequency determining part 118 and a signal line extending from the operational processing part 102 to the clock frequency generator 118. In other respects, configuration of the second embodiment is identical to that of the first embodiment.

The operational processing part 102 in the second embodiment has the function of notifying the status of an execution unit currently under execution to the clock frequency determining part 118 in addition to the function explained in conjunction with the first embodiment.

The clock frequency determining part 118 newly determines the clock frequency supplied to the processor according to the instant embodiment, based on the information about data amounts in storage in the storage 101 monitored by the data amount monitor 104 and the status of the currently executed execution unit given from the operational processing part 102. The information on the data amounts in the storage regions in the storage 101, which is sent from the data amount monitor 104, may be either a result of the monitoring of the storage amount of the entire storage 101 or a result of the monitoring of individual storage regions corresponding to individual execution units in the storage 101 when necessary.

Figure 7:
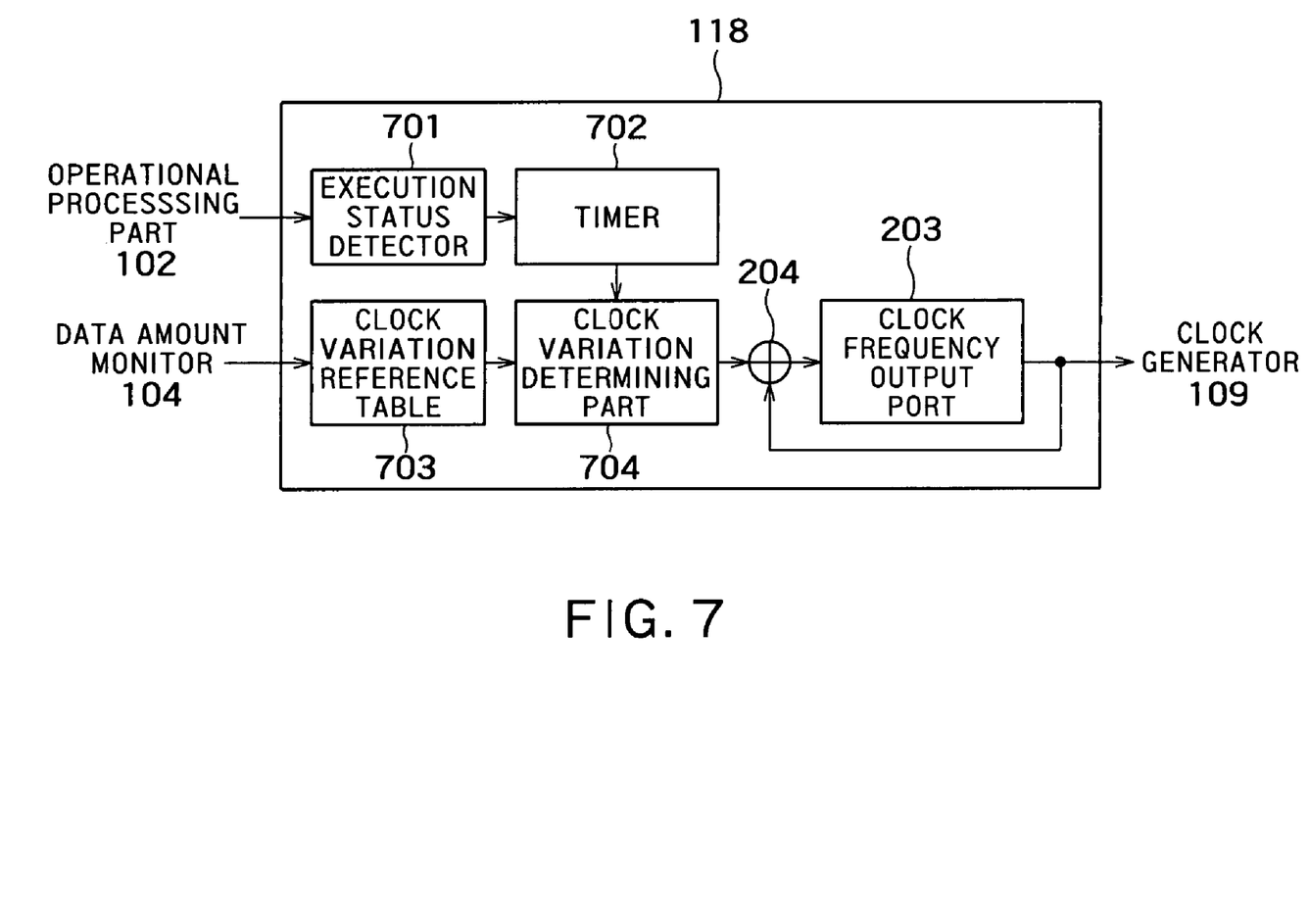
FIG. 7 is a diagram showing an exemplary arrangement of a clock frequency determining part in the second embodiment.

FIG. 7 shows an exemplary internal configuration of the clock frequency determining part 118. Here are shown an execution status detector 701, timer 702, clock variation reference table 703, clock variation determining part 203 and adder 204. The clock variation determining part 203 and the adder 204 are identical to those of the first embodiment.

The execution status detector 701 detects whether or not the execution unit currently under execution, notified from the operational processing part 102, exhibits the anticipated status. The anticipated status may be the status where a predetermined execution unit will be newly executed. Further, it may include the status where the execution order pattern of execution units has changed. For example, in case there are execution units A, B and C, the order of repeatedly executing A-B-A-B- . . . may be changed to the pattern of execution order of A-B-C-A-B-C- . . . , and this corresponds to a change of the status. Alternatively, when a certain execution unit itself generates a predetermined signal as a result of its execution or a certain preset value is changed, this is also contemplated by the anticipated status herein used. Once any such status is confirmed, the execution status detector 701 resets the time of the timer 702.

The timer 702 clocks the time from the point of time of a reset request from the execution status detector 701. Upon the reset, it resets the result of time clocking to zero, and again starts clocking of time from the reset point of time. The time counted is notified to the clock variation determining part 704.

The clock variation reference table 703 stores reference values of clock variations corresponding to data amounts notified from the data amount monitor 104. The reference values of clock variations herein used correspond to clock variations of FIG. 4 showing the first embodiment immediately after the count of the timer 702 is reset.

The clock variation determining part 704 determines whether or not the information on the clock frequency currently output from the clock frequency output port 203 should be changed, based upon the counted time by the timer 702 and the variation of clock for the data amount in storage obtained from the clock variation reference table 703.

Figure 8:
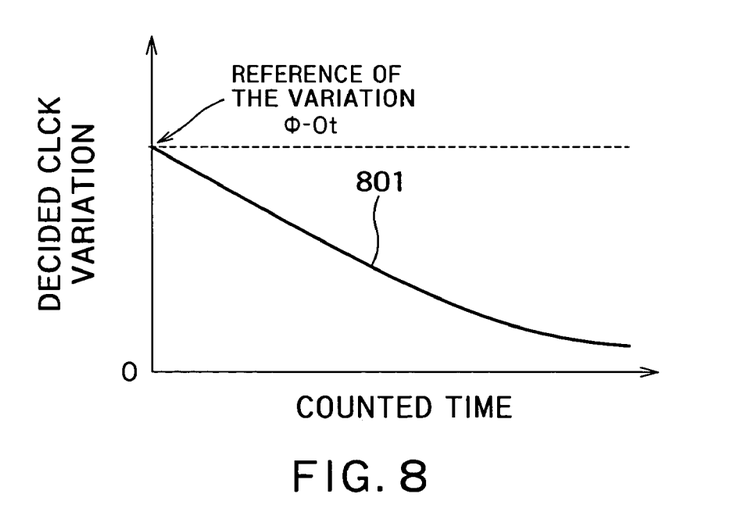
FIG. 8 is a graph showing an exemplary output of a clock variation determining part in the second embodiment.

FIG. 8 shows an exemplary relation between the time counted by the timer 702 and the clock variation in the clock frequency determining part 118 in form of a graph. Φ-0t shown in FIG. 8 is the reference of the clock variation obtained from the clock variation reference table 703 for the data amount notified from the data amount monitor 104.

The clock variation determining part 704 determines the clock variation so that the longer the time counted by the timer 702, the smaller the value of Φ-0t, as shown in the graph 801.

More specifically, here is employable a way of dividing the clock frequency obtained from the clock variation reference table 703 by the time currently counted by the timer 702.

In this manner, in the case where execution of a certain execution unit continues for a relatively long time, it is possible to prevent the clock frequency supplied to the processor according to the instant embodiment from changing largely. Therefore, it is possible to alleviate the risk of a large change of the throughput of the data processing irrespectively of continuous execution of the same processing.

THIRD EMBODIMENT

Figure 9:
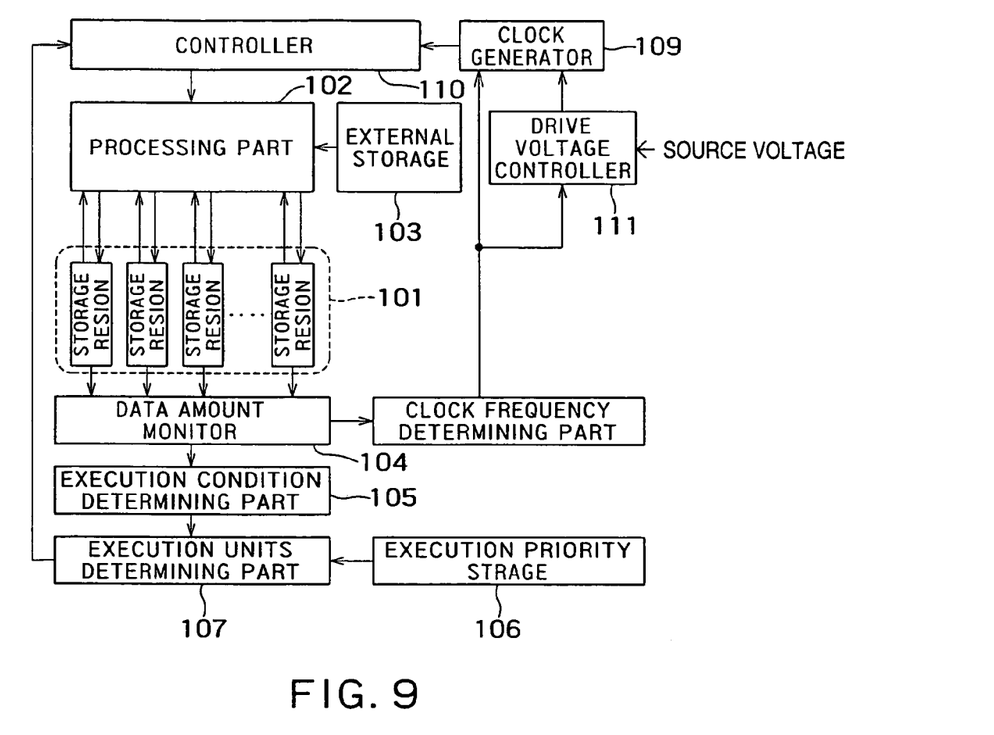
FIG. 9 is a diagram showing an exemplary block arrangement of a processor according to the third embodiment.

FIG. 9 shows an exemplary block arrangement of a processor according to the third embodiment. A difference of this block arrangement from the block arrangement of FIG. 1 showing the first embodiment lies in additionally including a drive voltage controller 111. In the other respects, the third embodiment is identical to the first embodiment.

The drive voltage controller 111 has the function of controlling the source voltage supplied to the processor according to the instant embodiment. The range of source voltage controlled by the drive voltage controller 111 may be either a source voltage supplied to the entire processor or the source voltage supplied to a part of the processor. Since the processor according to the third embodiment is configured to reduce the power consumption caused by a decrease of the clock frequency, it is desirable to apply it to the core part of the processor including the part for operational processing closely related to the increase or decrease of the clock frequency.

As the information for controlling the source voltage by the drive voltage controller 111, here is used a signal sent from the clock frequency determining part 108 to the clock generator 109. This is because the level of the clock frequency and the level of the source voltage required for the processor core are directly proportional. In general, when the clock frequency is high, a high drive voltage will be required.

Figure 10:
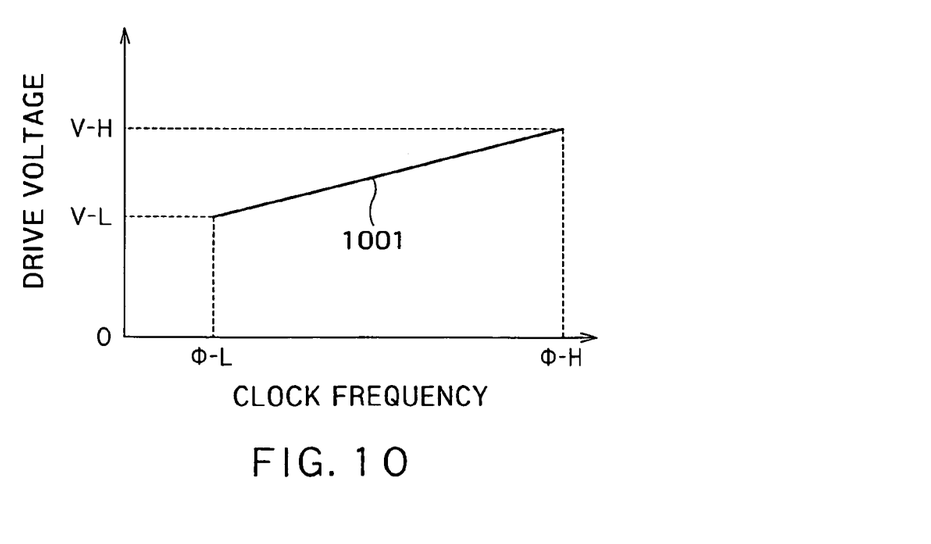
FIG. 10 is a graph showing an exemplary output of a drive voltage controller in the third embodiment of the invention.

FIG. 10 shows an exemplary relation between the clock frequency for operating the processor and the drive voltage controlled in conformity with the clock frequency in form of a graph. As shown in the graph 1001, the clock frequency and the drive voltage are controlled to keep a direct proportion. In this case, since it does not occur that both the clock frequency and the drive voltage supplied to the processor become zero, the graph exhibits changes from Φ-L to Φ-H and changes from V-L to V-H, respectively.

In this configuration, the processor can be reduced in power consumption by not only decreasing the clock frequency supplied to the processor but also by reducing the source voltage to the greatest possible extent.

FOURTH EMBODIMENT

Figure 11:
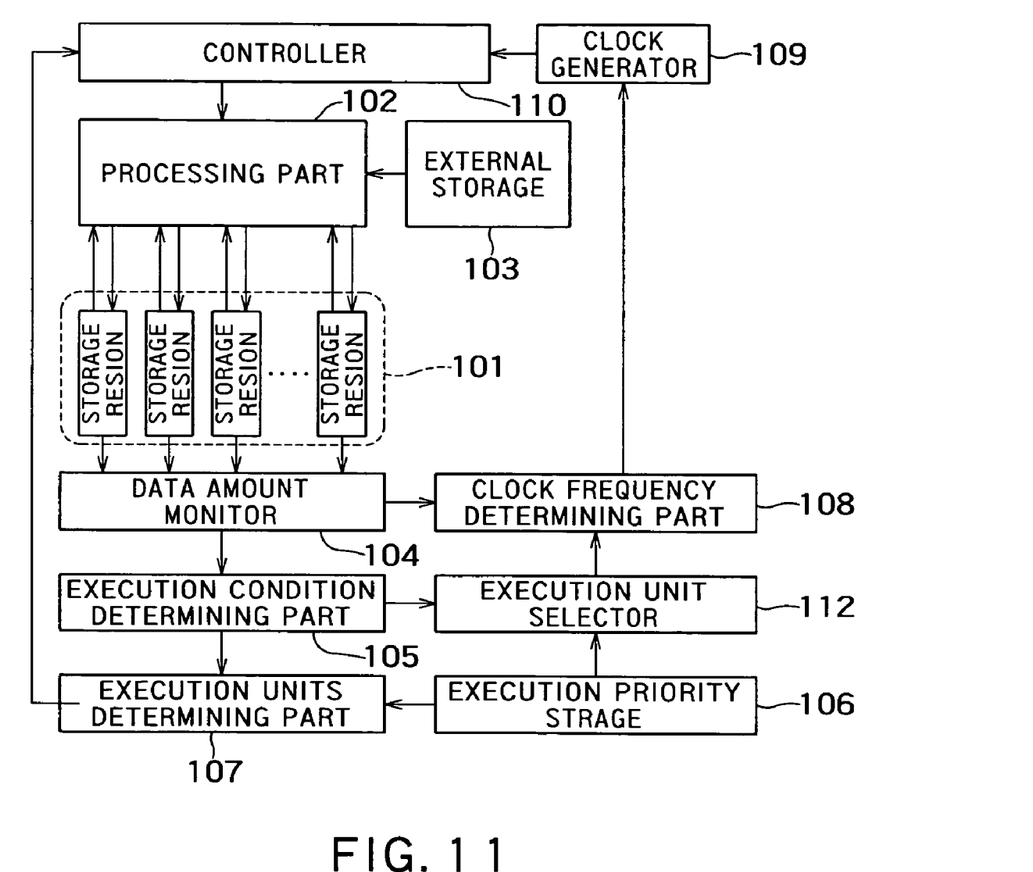
FIG. 11 is a diagram showing an exemplary block arrangement of a processor according to the fourth embodiment of the invention.

FIG. 11 shows an exemplary block arrangement of a processor according to the fourth embodiment. A difference of this block arrangement from that of FIG. 1 showing the first embodiment lies in additionally including an execution unit selector 112. In other respects, the fourth embodiment is identical to the first embodiment.

The execution unit selector 112 has the function of selecting an execution unit to be observed for determining the clock frequency to be supplied to the processor according to the instant embodiment, based upon the information on execution units judged by the execution condition determining part 105 to be currently executable and the information about priorities of execution units stored in the execution priority storage 106.

The execution priority storage 106 stores priorities of execution units to be executed subsequently. Among them, execution units having higher priorities have higher possibilities of being executed, and it will be less likely that the amounts of data to be processed reach critical levels. However, execution units having lower priorities have lower possibilities of being executed, and they are not executed unless the data amounts to be processed accumulate to a certain level.

If the clock frequency to be notified to the clock generator 109 is determined low by judging there is a margin from the storage region of the storage 101 corresponding to an execution unit having a high priority, it is possible that an execution unit having a low priority and having a small chance of execution cannot be fully executed within the determined time.

On this account, from the standpoint of alleviating such a risk, this embodiment is configured to select an execution unit stored in the execution priority storage 106 as having the lowest priority among execution units judged by the execution condition determining part 105 to be currently executable, and to determine the clock frequency based on the status of the selected execution unit.

In this configuration, all execution units can be executed without fail. Moreover, since execution units unprepared for execution may be excluded from consideration upon determining the clock frequency, it is also possible to reduce the time for determining the clock frequency.

The invention is not directly limited to the foregoing embodiments, but can be embodied in other forms by modifying the components within the extent not departing from the concept. Furthermore, the application contemplates various other inventions by appropriate combinations of the components disclosed in conjunction with the foregoing embodiments. For example, one or more of the components may be omitted from the embodiments, or components of different embodiments may be combined adequately.

Other embodiments of the present invention will be apparent to those skilled in the art from consideration of the specification and practice of the invention disclosed herein. It is intended that the specification and example embodiments will be considered as exemplary only, with a true scope and spirit of the invention being indicated by the following.

What is claimed is:

1. A processor, comprising:

a clock signal generator generating clock signals;

an operational processing part performing data processing which is divided into a plurality of execution units, in accordance with the clock signals;

a storage storing data per each execution unit, the execution unit being executed by the operational processing part as a unit;

a data amount detector detecting amounts of the data stored in the storage per each execution unit;

a clock frequency determining part determining a new clock frequency of the clock signals by using the amounts of the data, said clock signals being supplied newly to the operational processing part, the clock frequency determining part including a table indicating the relation between the amounts of the data detected by the data amount detector and the variation of the clock frequency, a clock frequency holder holding a practical current clock frequency supplied to the operational processing part, and an adder adding to the current clock frequency the variation obtained from the table, the clock frequency determining part determining newly the output value of the adder as the clock frequency of the clock signals;

an execution status detector detecting whether a certain execution unit becomes the predetermined state or not;

a timer newly starting the clocking when the execution status detector detects that the execution unit has become the predetermined state; and a clock frequency changing part changing the clock frequency, the clock frequency changing part decreasing the absolute value of the variation according to the value of the timer, wherein the adder adds to the current clock frequency the variation which is changed by the clock frequency changing part.

2. A clock frequency determining method determining a clock frequency supplied to a processor, which comprises: an operational processing part processing data in accordance with clock signals; a storage storing the data per an execution unit, the execution unit being executed by the operational processing part as a unit; a data amount detector detecting amounts of the data stored in the storage per each execution unit; a clock frequency determining part determining the clock frequency and having a table indicating the relation between the amounts of the data detected by the data amount detector and the variation of the clock frequency; an execution status detector detecting a status of a certain execution unit; a timer timing the detection of the execution status detector; a clock frequency changing part changing the variation of the clock frequency, the method comprising:

detecting amounts of data associated with the respective execution units, said data being stored in the storage;

detecting whether a certain execution unit becomes a predetermined state or not, by using the execution status detector;

starting the timing when the execution status detector detects that the execution unit has become the predetermined state by using the timer;

changing the clock frequency, so that the absolute value of the variation is decreased according to the value of the timer by using the clock frequency changing part;

adding the variation of the clock frequency to the current clock frequency, the variation of the clock frequency being obtained from the table and being changed by the clock frequency changing part;

determining a result of the addition as a new clock frequency to be supplied to the operational processing part; and generating clock signals supplied to the operational processing part in accordance with the new clock frequency.

* * * * *